(12) United States Patent
Braun et al.

(10) Patent No.: US 10,295,016 B2
(45) Date of Patent: May 21, 2019

(54) PLATE LINK CHAIN

(71) Applicant: Schaeffler Technologies AG & Co. KG, Herzogenaurach (DE)

(72) Inventors: Konstantin Braun, Rastatt (DE); Stephan Penner, Bühl (DE); Alaa Harmouch, Karlsruhe (DE); Jürgen Ochs, Bühl (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 115 days.

(21) Appl. No.: 15/537,309

(22) PCT Filed: Nov. 20, 2015

(86) PCT No.: PCT/DE2015/200512
§ 371 (c)(1),
(2) Date: Jun. 16, 2017

(87) PCT Pub. No.: WO2016/095913
PCT Pub. Date: Jun. 23, 2016

(65) Prior Publication Data
US 2018/0038445 A1 Feb. 8, 2018

(30) Foreign Application Priority Data
Dec. 17, 2014 (DE) .......... 10 2014 226 301

(51) Int. Cl.
*F16G 5/18* (2006.01)

(52) U.S. Cl.
CPC ..................... *F16G 5/18* (2013.01)

(58) Field of Classification Search
CPC ........................................................ F16G 5/18
USPC ........................................................ 474/245
See application file for complete search history.

(56) References Cited

U.S. PATENT DOCUMENTS

| 2001/0046917 | A1* | 11/2001 | Linnenbrugger | F16G 5/18 474/215 |
| 2004/0248682 | A1* | 12/2004 | Wagner | F16G 5/18 474/215 |
| 2005/0202915 | A1* | 9/2005 | Pichura | F16G 5/18 474/206 |
| 2005/0261095 | A1* | 11/2005 | Linnenbrugger | F16G 5/18 474/215 |
| 2005/0282674 | A1* | 12/2005 | Teubert | F16G 5/18 474/229 |
| 2007/0161446 | A1* | 7/2007 | Penner | F16G 5/18 474/215 |

(Continued)

FOREIGN PATENT DOCUMENTS

| CN | 1526974 A | 9/2004 |
| CN | 101331342 A | 12/2008 |

(Continued)

*Primary Examiner* — Michael R Mansen
*Assistant Examiner* — Mark K Buse
(74) *Attorney, Agent, or Firm* — Kevin L. Parks

(57) ABSTRACT

A plate link chain for a continuously variable transmission of a motor vehicle. The chain is formed from longer and shorter chain links that are formed from and that include respective longer and shorter link plates that are coupled to each other by pairs of rocker pressure members. Both the shorter link plates and the longer link plates have at least one longitudinally extending external appendage.

14 Claims, 2 Drawing Sheets

(56) References Cited

U.S. PATENT DOCUMENTS

| | | | | |
|---|---|---|---|---|
| 2007/0275805 A1* | 11/2007 | Huttinger | ................ | B21L 9/065 474/215 |
| 2009/0181817 A1* | 7/2009 | Huttinger | ................ | B21L 11/00 474/229 |
| 2014/0045633 A1* | 2/2014 | Nakazawa | ................ | F16G 5/18 474/242 |
| 2018/0156311 A1* | 6/2018 | Harmouch | ................ | F16G 5/18 |
| 2018/0347674 A1* | 12/2018 | Harmouch | ................ | F16H 9/24 |

FOREIGN PATENT DOCUMENTS

| | | |
|---|---|---|
| DE | 19743676 A1 | 4/1998 |
| DE | 10047979 A1 | 4/2001 |
| DE | 10110896 A1 | 10/2001 |
| DE | 10118102 A1 | 10/2001 |
| DE | 102004007100 A1 | 9/2004 |
| DE | 102007018501 A1 | 11/2007 |
| WO | 2007038907 A1 | 4/2007 |
| WO | 2007068228 A1 | 6/2007 |

* cited by examiner

PLATE LINK CHAIN

CROSS-REFERENCE TO RELATED APPLICATIONS

This application is the U.S. national phase patent application under 35 U.S.C. § 371 of International Patent Application Serial No. PCT/DE2015/200512, having an international filing date of 20 Nov. 2015, and designating the United States, which claims priority based upon German Patent Application No. DE 10 2014 226 301.8, filed on 17 Dec. 2014, the entire contents of each of which applications are hereby incorporated by reference herein to the same extent as if fully rewritten.

BACKGROUND OF THE INVENTION

Field of the Invention

The present invention relates to a plate link chain, in particular for a continuously variable transmission of a motor vehicle, the chain having longer and shorter chain links that include respective longer and shorter link plates that are coupled to each other by pairs of rocker pressure members.

Description of the Related Art

From the German patent application DE 10 2004 007100 A1 a plate link chain is known having short and long link plates, which have at one of their longitudinal ends an appendage, such that the appendage overlaps a short link plate, which is connected to the long link plate in the longitudinal direction of the plate link chain, with another long link plate interposed.

From the German patent application DE 10 2007 018 501 A1 a plate link chain made of a plurality of link plates is known, which plates form chain links that are each connected to an adjacent chain link by a joint. The plate link chain includes damping plates, each of which connects two adjacent chain links to one another elastically with regard to a bending motion. The damping plate damps a bending of the plate link chain in at least one direction.

An object of the present invention is to provide a plate link chain, in particular for a continuously variable transmission of a motor vehicle, the chain having longer and shorter chain links that are formed from respective longer and short link plates, and that coupled by pairs of rocker pressure members and that can be produced cost-effectively and/or that has a long service life.

SUMMARY OF THE INVENTION

The above-noted object is achieved in the case of a plate link chain, in particular for a continuously variable transmission in a motor vehicle, wherein the chain includes longer and shorter chain links formed from respective longer and shorter link plates that are coupled to each other by pairs of rocker pressure members. Both the shorter link plates and the longer link plates have at least one longitudinally extending appendage. That feature enables the production and assembly, as well as the operating properties of the plate link chain, to be greatly simplified.

A preferred exemplary embodiment of the plate link chain is characterized in that both the shorter link plates and the longer link plates have more than two longitudinally extending appendages. That feature enables the production and assembly, as well as the operating properties of the plate link chain, to be further simplified.

Another preferred exemplary embodiment of the plate link chain is characterized in that all the link plates have four longitudinally extending appendages each. That feature enables an unwanted kinking or bending of the plate link chain to be prevented in a simple manner.

Another preferred exemplary embodiment of the plate link chain is characterized in that the appendages extend as elongations of long sides of the link plates. The appendages on the link plates extending as elongations of the long sides can also be referred to as tips.

Another preferred exemplary embodiment of the plate link chain is characterized in that the appendages are located at corner regions of the link plates. Because of the location of the tips or appendages at all four corner regions of the link plates their handling is simplified, both in producing and in assembling the plate link chain.

Another preferred exemplary embodiment of the plate-link chain is characterized in that the plate link chain includes only shorter link plates and longer link plates. The link plates with the appendages or tips make it possible to prolong the service life of the shorter and longer link plates, compared to link plates without tips or appendages.

Another preferred exemplary embodiment of the plate link chain is characterized in that the shorter link plates and the longer link plates each have a single opening. The design of the link plates without a middle crosspiece that provides the link plate with two separate openings further simplifies their production and installation.

Another preferred exemplary embodiment of the plate link chain is characterized in that all the shorter link plates of the plate link chain are designed the same. That feature makes it possible to significantly reduce the production costs of the plate link chain made in accordance with the present invention.

Another preferred exemplary embodiment of the plate link chain is characterized in that all the longer link plates of the plate link chain are designed the same. That feature makes it possible to further reduce the production costs of the plate link chain made in accordance with the present invention.

In addition, the present invention relates to a shorter link plate and/or a longer link plate for a plate link chain as described above. The link plates are marketable separately.

The invention can also relate to a CVT transmission having a plate link chain as described above. In the CVT transmission, the plate link chain serves to connect two sets of conical disks with each other as a drive arrangement. The letters CVT stand for continuously variable transmission, and mean that the CVT transmission is variable by stepless adjustments of the transmission ratio.

BRIEF DESCRIPTION OF THE DRAWINGS

Additional advantages, features, and details of the present invention can be understood from the following description, in which various exemplary embodiments are described in detail with reference to the drawings. The drawing figures show the following.

DESCRIPTION OF THE PREFERRED EMBODIMENTS

Figure 1:
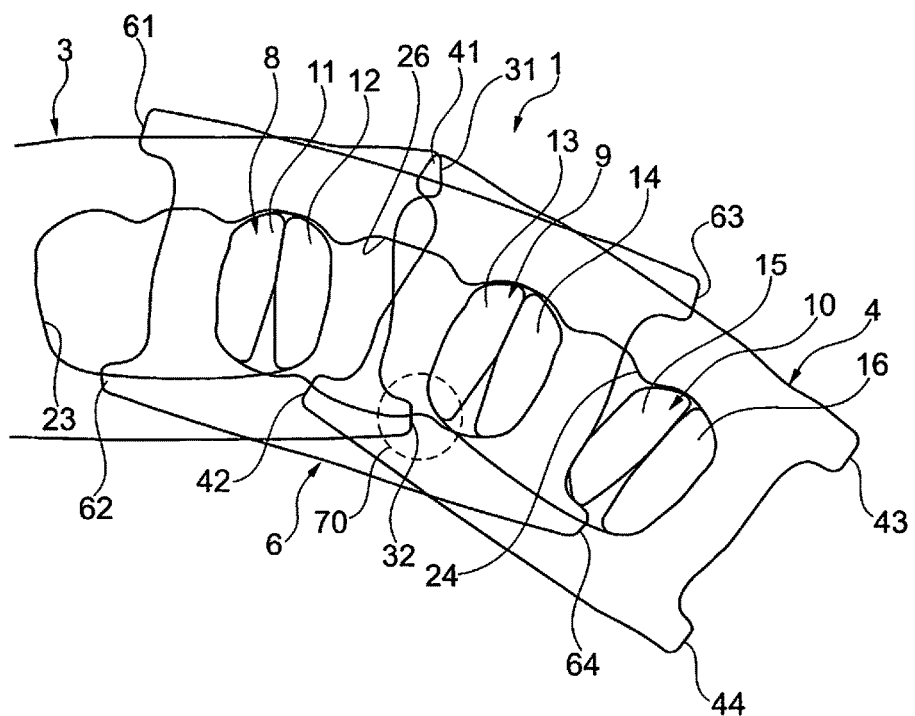
FIG. 1 shows a portion of a plate link chain in accordance with the present invention, the portion of the chain shown having two shorter link plates and one longer link plate and shown in top a side view.

FIG. 1 shows a portion of a plate link chain in accordance with the present invention, the chain portion having two shorter link plates and one longer link plate and shown in a side view. Rocker pressure member pairs 8, 9, and 10 serve to connect the link plates 3, 4, and 6 to one another and to other link plates (not shown) of the plate link chain 1. Each pressure member pair 8, 9, and 10 includes two rocker pressure members 11, 12; 13, 14; and 15, 16.

Figure 2:
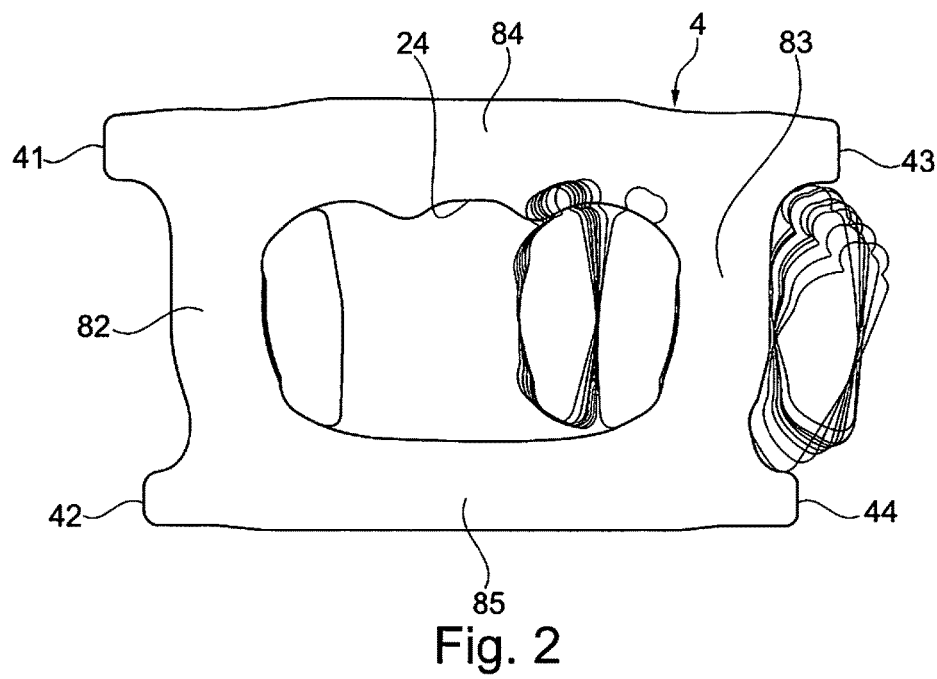
FIG. 2 shows a side view one of the shorter link plates of the plate link chain shown in FIG. 1.
Figure 3:
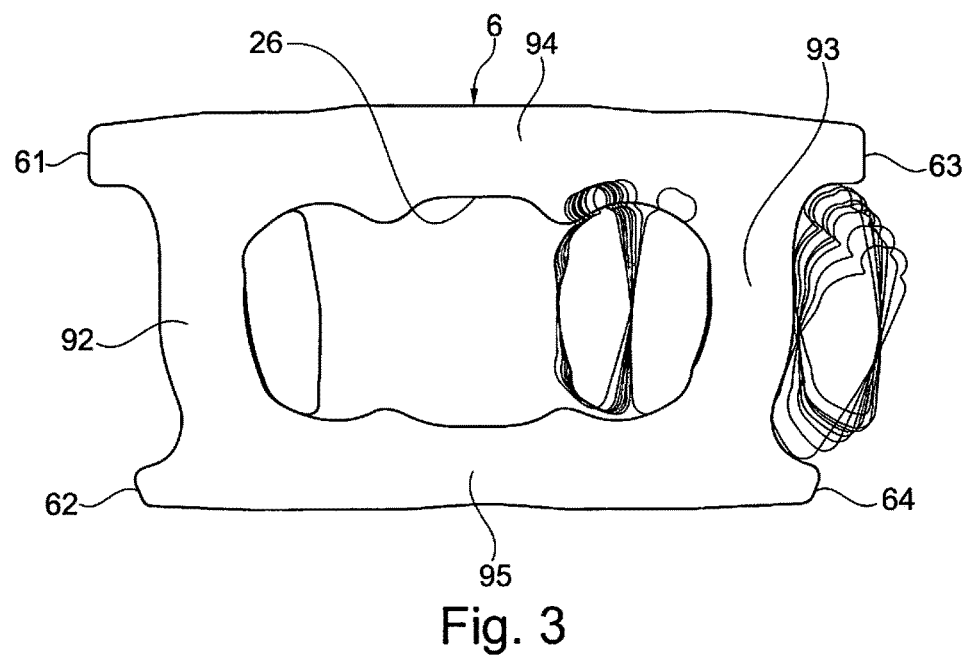
FIG. 3 shows a side view of the longer link plate of the plate link chain shown in FIG. 1.

The plate link chain in accordance with the present invention includes only two types of link plates in total, namely the shorter link plates 3, 4 in the form as shown in FIG. 2 and the longer link plates 6 in the form as shown in FIG. 3. The shorter link plates 3, 4 are also referred to as short link plates. By analogy, the longer link plates 6 are also referred to as long link plates. All long link plates 6 are designed the same. All short link plates 3, 4 are likewise designed the same.

Apart from the use of two types of link plates, the plate link chain in accordance with the present invention is ultimately designed similarly to the plate link chain described in German published unexamined application DE 190 47 979 A1. The plate link chain in accordance with the present invention is used as a component in a continuously variable, chain-driven, conical pulley transmission, similar to the chain disclosed in that German patent application.

The shorter link plate 4 shown in FIG. 2 includes a left link plate side strap 82 and a right link plate side strap 83. The link plate side straps 82 and 83 are joined at their upper ends to an upper link plate strap 84. At the bottom of link plate 4, the two link plate side straps 82 and 83 are joined at their lower ends to a lower link plate strap 85.

As shown in FIG. 1, shorter link plates 3, 4 include a common opening 23, 24, respectively, for receiving two rocker pressure member pairs 9 and 10, respectively. The longer link plate 6 likewise includes only one common opening 26 for receiving two rocker pressure member pairs 8, 9.

The shorter link plates 3, 4 and the longer link plate 6 used to form the plate link chain 1 in accordance with the present invention, in the side view shown, each have essentially the overall form of a rectangle. The upper link plate straps 84, 94 and the lower link plate straps 85, 95 are longer than the link plate side straps 82, 83 and 92, 93. The sides of the rectangles associated with the upper and lower link plate straps 84, 85 and 94, 95 are therefore also referred to as long sides.

The shorter link plate 4 shown in FIG. 2 by itself has at all four outer corners a respective outwardly extending appendage 41, 42, 43, 44 that effectively elongate the length of the respective long sides. On the shorter link plate 3 as partially shown in FIG. 1, only two appendages 31, 32 are visible.

The longer link plate 6 shown in FIG. 3 by itself likewise includes at all four outer corners a respective outwardly extending appendage 61, 62, 63, 64 that effectively elongate the length of the respective long sides. The appendages 61 through 64 and 41 through 44 are also referred to as tips.

The construction space for the tips 31, 32, 41 through 44 and 61 through 64 is based upon the kinematics of the nearest rocker joint. As indicated in FIGS. 2 and 3 by a sequence of contours of individual rocker pressure pieces, the contour of the tips or appendages 41 through 44 and 61 through 64 is adapted to that kinematic model so that a collision of the components of the plate link chain 1 during operation is prevented. At the same time, the appendages 31, 32, 41 through 44 and 61 through 64 are advantageously long enough so that they perform a dual function.

According to one aspect of the present invention, the appendages 31, 32, 41 through 44 and 61 through 64 serve to provide an overlapping of portions of the link plates 3, 4, and 6. Moreover, the appendages 31, 32, 41 through 44 and 61 through 64 also serve to provide protection against kinking of the chain. Furthermore, by virtue of the tips or appendages 31, 32, 41 through 44 and 61 through 64 at the link plate corners, the link plates 3, 4, and 6 include more material and more stiffness, which increases the life of the plate link chain 1.

An upper limit for the length of the appendages 31, 32, 41 through 44 and 61 through 64 results from the fact that an excessively long appendage or tip will collide with the link plate which is three positions further at the same level in a plate unit (position in the link). The appendage or tip can only be long enough, at maximum, so that the tips or appendages just do not yet touch, as indicated in FIG. 1 by dashed circle 70.

What is claimed is:

1. A plate link chain for a continuously variable transmission of a motor vehicle, said plate link chain comprising: longer and shorter chain links that include respective longer and shorter link plates that are coupled to each other by pairs of rocker pressure members, wherein both the shorter link plates and the longer link plates have more than two longitudinally extending external appendages located at external corner regions of the shorter link plates and the longer link plates.

2. A plate link chain according to claim 1 wherein each of the shorter link plates and the longer link plates have four longitudinally extending external appendages.

3. A plate link chain according to claim 1, wherein the longitudinally extending external appendages extend along and serve to elongate long sides of the shorter link plates and the longer link plates.

4. A plate link chain according to claim 1, wherein the plate link chain includes only shorter link plates and longer link plates.

5. A plate link chain according to claim 1, wherein the shorter link plates and the longer link plates each have an opening.

6. A plate link chain according to claim 1, wherein all the shorter link plates of the plate link chain are designed the same.

7. A plate link chain according to claim 1, wherein all the longer link plates of the plate link chain are designed the same.

8. A link plate for a motor vehicle chain comprising:
a left link plate side strap comprising a first upper end and a first lower end;
a right link plate side strap comprising a second upper end and a second lower end;
an upper link plate strap, longer than the left link plate side strap and the right link plate side strap, joining the first upper end to the second upper end;
a lower link plate strap, longer than the left link plate side strap and the right link plate side strap, joining the first lower end to the second lower end; and,
at least two longitudinally extending external appendages that extend along and effectively elongate the upper link plate strap, the lower link plate strap, or both of the upper link plate strap and the lower link plate strap.

9. The link plate of claim 8 wherein the at least two longitudinally extending external appendages is four longitudinally extending external appendages that extend along and effectively elongate each end of the upper link plate strap and each end of the lower link plate strap.

10. The link plate of claim 9 wherein:
the upper link plate strap is joined to the left link plate side strap at a first corner region and to the right link plate side strap at a second corner region;
the lower link plate strap is joined to the left link plate side strap at a third corner region and to the right link plate side strap at a fourth corner region; and,
the four longitudinally extending external appendages extend from the first corner region, the second corner region, the third corner region, and the fourth corner region, respectively.

11. The link plate of claim 8 wherein the upper link plate strap or the lower link plate strap is joined to the left link plate side strap or the right link plate side strap at a first corner region and a one of the at least two external appendages is located at the first corner region.

12. The link plate of claim 8 further comprising an opening.

13. A plate link chain for a continuously variable transmission of a motor vehicle comprising:
a shorter one of the link plate of claim 8;
a longer one of the link plate of claim 8; and,
a pair of rocker pressure members coupling the shorter one of the link plate to the longer one of the link plate.

14. A plate link chain for a continuously variable transmission of a motor vehicle comprising:
a plurality of shorter ones of the link plate of claim 8, all designed the same;
a plurality of longer ones of the link plate of claim 8, all designed the same; and,
a plurality of pairs of rocker pressure members coupling the plurality of shorter ones of the link plate to the plurality of longer ones of the link plate.

* * * * *